United States Patent
Bojesen et al.

(10) Patent No.: US 6,547,624 B1
(45) Date of Patent: Apr. 15, 2003

(54) SYSTEM FOR RECORDING AND EDITING FILMS

(75) Inventors: Simon Berg Bojesen, Billund (DK); Richard Siegrist, Vandel (DK)

(73) Assignee: Interlego AG, Baar (CH)

( * ) Notice: Subject to any disclaimer, the term of this patent is extended or adjusted under 35 U.S.C. 154(b) by 0 days.

(21) Appl. No.: 09/890,375

(22) PCT Filed: Dec. 23, 1999

(86) PCT No.: PCT/DK99/00729

§ 371 (c)(1),
(2), (4) Date: Sep. 24, 2001

(87) PCT Pub. No.: WO00/44465

PCT Pub. Date: Aug. 3, 2000

(30) Foreign Application Priority Data

Jan. 29, 1999 (DK) .................................. 1999 00130

(51) Int. Cl.⁷ ............................................. A63H 33/04
(52) U.S. Cl. ..................... 446/85; 446/219; 446/175; 446/485; 446/83; 273/157 R
(58) Field of Search .................... 446/85, 86, 87, 446/88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119; 273/157 R

(56) References Cited

U.S. PATENT DOCUMENTS

| 1,521,339 A | 12/1924 | Taylor |
| 1,889,284 A | 11/1932 | Hansel |
| 3,005,282 A | 10/1961 | Christiansen |
| 3,535,817 A | 10/1970 | Fischer |
| 3,574,954 A | 4/1971 | Schone |
| 3,651,597 A | * 3/1972 | Daenen ....................... 446/124 |
| 4,132,028 A | 1/1979 | Ogawa |
| 4,651,993 A | * 3/1987 | Netsch, Jr. ............... 273/157 R |
| 4,911,673 A | 3/1990 | Hollowell |
| 5,030,158 A | 7/1991 | Gal et al. |
| 5,042,972 A | * 8/1991 | Bach et al. ...................... 446/91 |
| 5,481,257 A | 1/1996 | Brubaker et al. |
| 5,555,019 A | 9/1996 | Dole |
| 5,733,167 A | 3/1998 | Kroigaard |

FOREIGN PATENT DOCUMENTS

| DK | 154964 B | 1/1989 |
| EP | 0 281 427 A2 | 9/1988 |
| EP | 0 231 808 B1 | 4/1991 |

* cited by examiner

Primary Examiner—Derris H. Banks
Assistant Examiner—Dmitry Suhol
(74) Attorney, Agent, or Firm—Pitney, Hardin, Kipp & Szuch LLP

(57) ABSTRACT

A toy building set of building elements (10, 14) having a coupling means (11, 12, 13) by which building elements (10, 14) may be built together. One of the building elements (20) contains a camera, which is adapted to record images of its surroundings. A user may built a remote-controlled toy (30) in which the building element (20) with the camera may be arranged in positions and with an orientation at the user's option. A film production system with a camera and recording and editing facilities. Movable objects and a plurality of predefined positions for the movable objects, and means for holding the movable objects in selected one of the predefined positions when the camera records one or more images. Thereby the movable objects can be placed accurately and repeatedly in predetermined positions. The predefined positions are preferably defined by toy building elements having coupling means for interconnecting building elements.

15 Claims, 4 Drawing Sheets

SYSTEM FOR RECORDING AND EDITING FILMS

Figure 1:
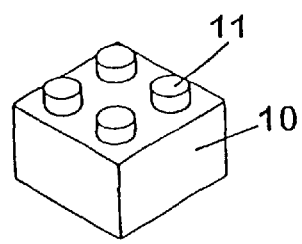

The invention relates to a toy building set of building elements with coupling means for interconnecting building elements, where the coupling means are arranged in a periodical pattern with a modular spacing allowing interconnection of building elements in discrete relative positions to form composite structures.

U.S. Pat. No. 5,555,019 discloses a video production system comprising a miniature vehicle with an on-board video camera. The vehicle can be remotely controlled to move around in a miniature landscape, and the video camera transmits real time video images to a remote video production system.

U.S. Pat. No. 3,005,282 describes an example of building elements of such a toy building set in which the coupling means are in the form of studs and corresponding cavities for receiving studs on other building elements in a releasable frictional engagement. Other toy building sets with several different types of coupling means are known, and the present invention comprises such toy building sets with interconnectable toy building elements.

U.S. Pat. No. 5,030,158 describes a toy building set in which some building elements contain passive optical components such as lenses, mirrors and prisms. Optical instruments may be built with this building set.

Other building sets with building elements containing passive optical components are shown eg in the documents U.S. Pat. Nos. 1,521,339, 1,889,284, 3,535,817, 3,574,954, 4,132,028 and 4,911,673. It is common to these that they involve building sets exclusively for the construction of passive optical instruments.

U.S. Pat. No. 5,481,257 shows a system with a remote-controlled toy having a permanently incorporated video camera which transmits images of its surroundings to a receiver having a display. A user observes the images on the display, and, on the basis of this, the user operates a control unit, which generates control signals that are transmitted to the remote-controlled toy. The user is hereby able to control and manoeuvre the remote-controlled toy solely on the basis of images on the display. What is involved here is a ready configured system, which the user has no possibility of changing, and particularly the position of the camera on the toy cannot be changed.

An object of the invention is to provide a toy building set which gives the user a greater degree of freedom than the known systems.

This object is achieved by the invention, which is a toy building set with a toy building element that contains a camera. Hereby, the user may e.g. build a remote-controlled toy, where the camera may be placed in positions at the user's option, which is not possible with any of the known systems. If the constructed toy is e.g. a remote-controlled car, the user may place the camera so that it "looks" ahead, and the user sees images of the surroundings ahead of the car on the display, which will be the normal situation.

In addition, the user also has the possibility of arranging the camera in more imaginative and untraditional positions. In such positions, the camera can "look" laterally, rearwardly, upwardly, downwardly or in any direction that the user might wish. Thus, it is just the user's imagination that sets limits, and with the camera arranged in such alternative positions it is possible to vary the degree of difficulty of the task it is for the user to control a remote-controlled car solely on the basis of images from the camera. The user hereby has the opportunity of creating new challenges himself. Thus, it will be a different and considerably more-exciting challenge for the user to control a remote-controlled car on the basis of images taken laterally or rearwardly, and these new possibilities will stimulate the users' imagination and their creativity.

The invention provides the possibility of building toy scenes and landscapes with movable objects such as toy figures and vehicles that can be moved around in the toy landscape, while pictures such as video films are being made/taken of the scene/setup. It is particularly advantageous that the building elements used are of the type known eg from U.S. Pat. No. 3,005,282 with coupling studs arranged in a periodical pattern with a uniform spacing between the coupling studs. When a film is being made, repeated recordings of the same event are often made, and the final result is then being composed of the best sequences from different takes. When making repeated recordings or takes of the same event it is difficult to arrange everything in exactly the same way each time, and moving objects such as figures and vehicles are possibly not moved along exactly the same path and at the same speed. Here the coupling means on the building elements are of great help in obtaining the same positions for each of the often many objects used to compose a scene, and in the final product the observer will get the impression that the whole sequence is the result of only one recording session.

While a vehicle such as a toy car will often move along a fairly simple path, a toy figure simulating eg a human being or an animal will usually have a much more complex motion pattern of its limbs. When making recordings of eg a toy figure in motion it is important that the motions of the figure appear to be natural and lifelike, and in order to achieve this the figure can be placed in predetermined positions along its planned path and with a predetermined posture in each position. This can be very time consuming, and software exists for editing recorded sessions and individual images. By means of known software it is possible to synthesize one or several images by interpolation between recorded images. The recording staff thus only needs to record a fraction of the images needed in the final film, and the remaining intermediary images will then be synthesized by interpolation.

When making such individual images the user or director needs to arrange predetermined points along the planned path of movement of the figure or other object with great precision in order to achieve natural and lifelike movements. Here again the coupling means on the building elements are of great help.

Figure 2:
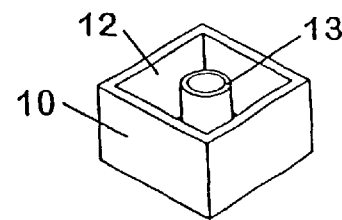
Figure 3:
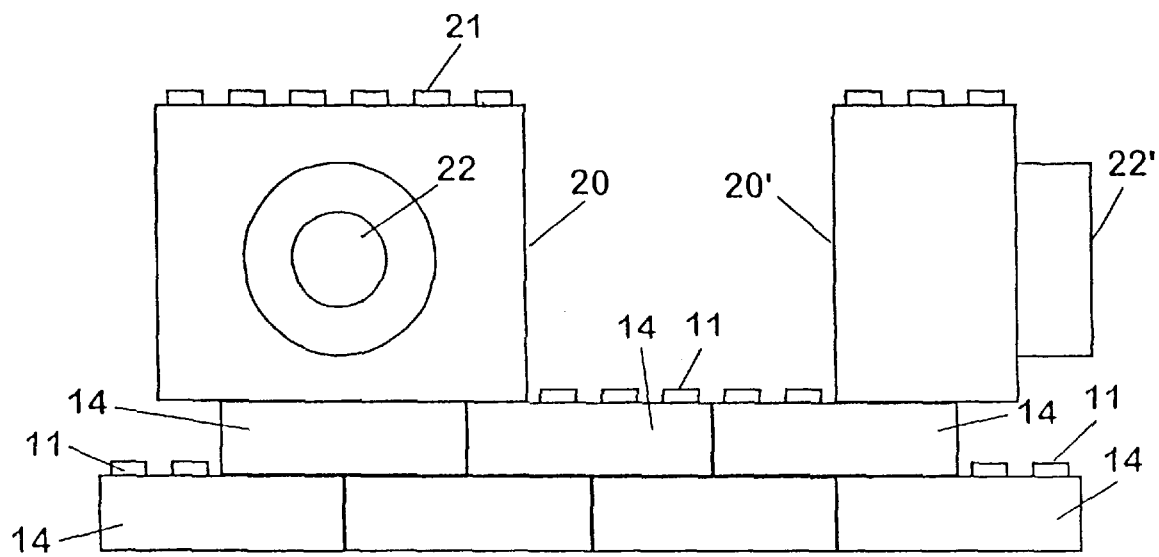
Figure 4:
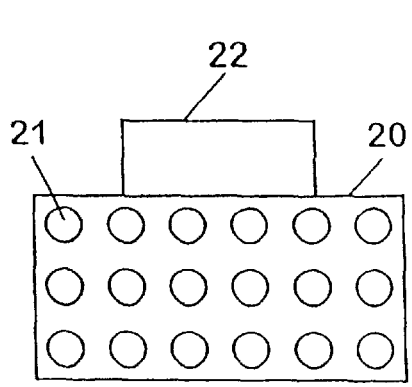
Figure 5:
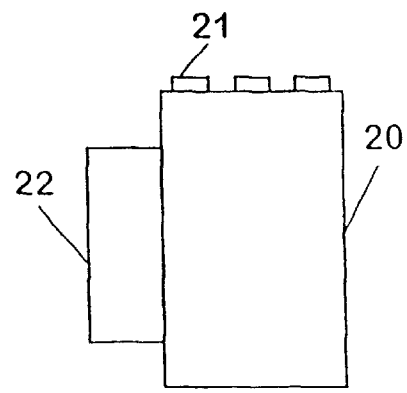
Figure 6:
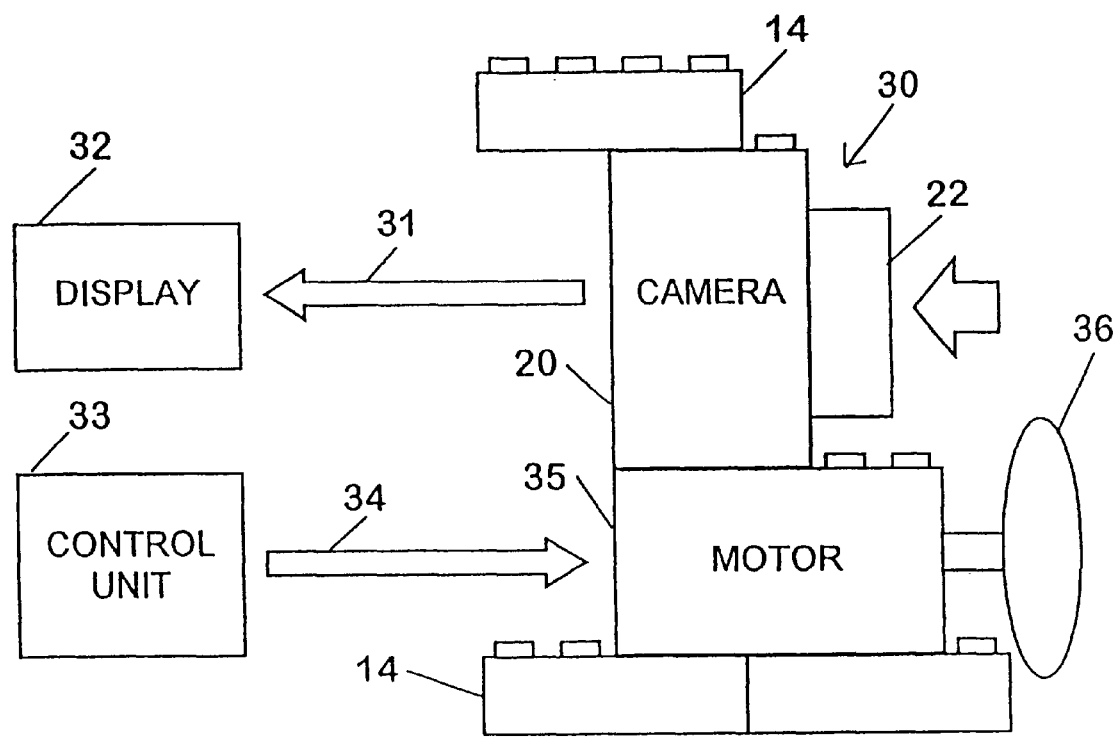
Figure 7:
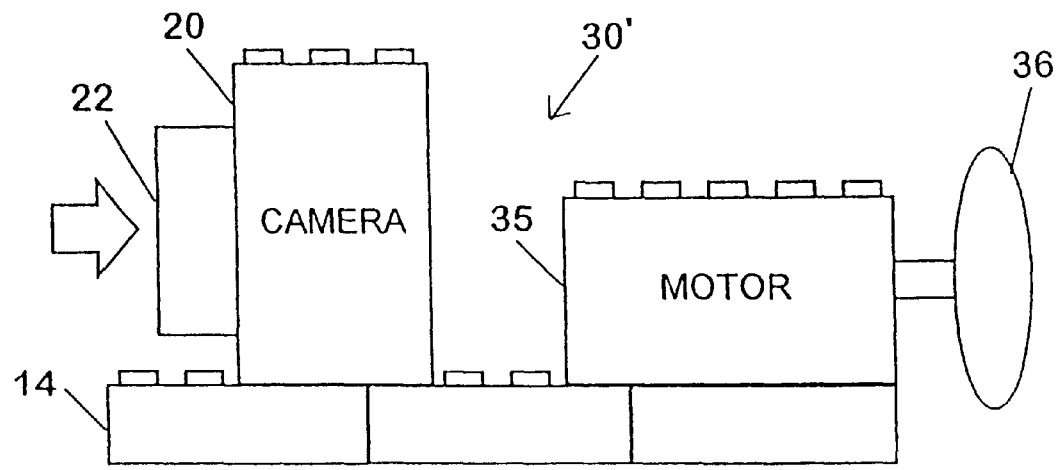
Figure 8:
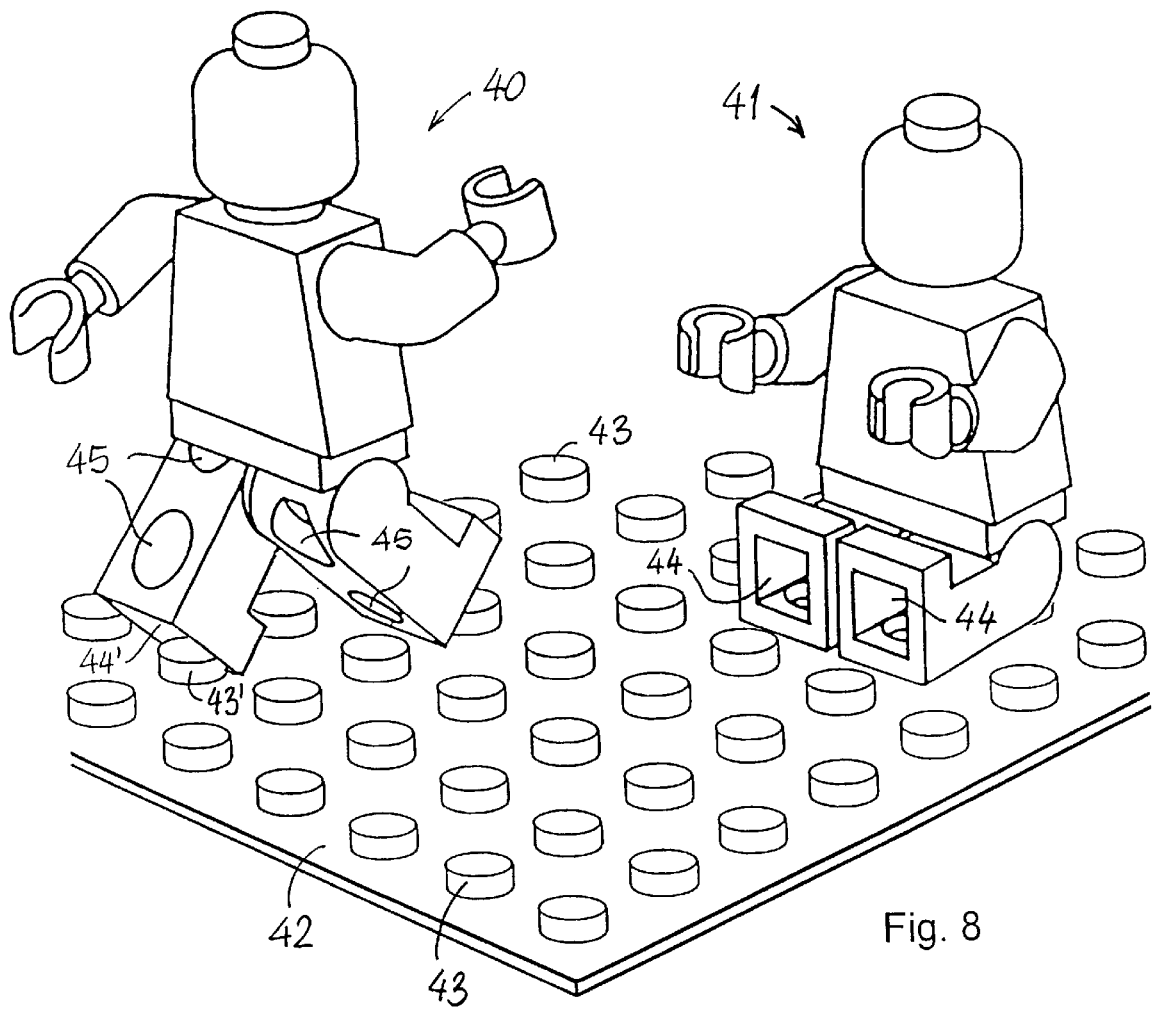
Figure 9:
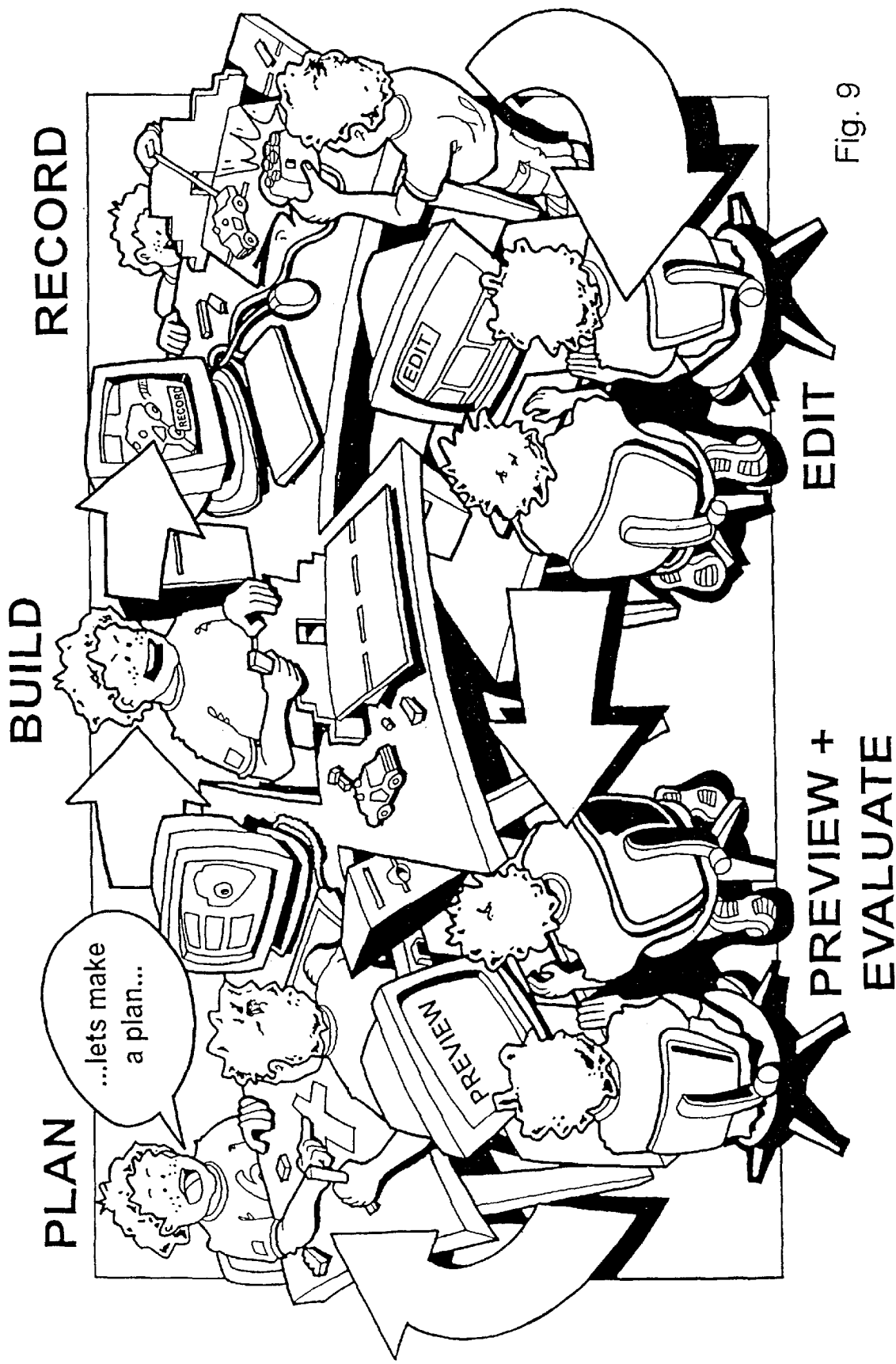

The invention will be described more fully below with reference to the drawings, in which FIG. 1 shows a known toy building element seen in perspective from above, FIG. 2 shows the building element of FIG. 1 seen in perspective from below, FIG. 3 shows a toy building set in a preferred embodiment of the invention, FIG. 4 shows a toy building element containing a camera seen from above, FIG. 5 shows the toy building element of FIG. 4 seen from the side, FIG. 6 shows a system with a remote-controlled toy according to the invention, FIG. 7 shows a remote-controlled toy in another configuration than in FIG. 6, FIG. 8 is a perspective view of a known toy building set with two toy figures, and FIG. 9 is a general view of a typical process using the invention.

FIGS. 1 and 2 show a known toy building element 10 having an outer shape as a right-angled box with a square horizontal contour. This building element has four cylindrical coupling studs 11 on its upper side, arranged so that the centres of the coupling studs form a square. The element 10 has an open bottom with access to a cavity 12 in the element. This known building element may be built together in that two such elements are placed on top of each other so that the coupling studs 11 on one of the elements extend into the cavity 12 on the other element, such that the coupling studs are in frictional engagement with the side walls of the cavity and with a tubular coupling element 13 centrally in the cavity 12. This is described in U.S. Pat. No. 3,005,282.

FIG. 3 shows a plurality of known toy building elements 14 of the same type as the elements 10 in FIGS. 1–2, just with a rectangular horizontal contour, and with coupling studs 11 on the upper sides. FIG. 3 shows seven such building elements 14 built together in a known manner in that the coupling studs 11 on the lower row of building elements 14 are received in cavities (not shown) in the bottom of the upper row of building elements 14. FIG. 3 also shows a building element 20 of the same type as the building elements 10 and 14 and with coupling studs 21 on the upper side and a cavity (not shown) in its lower side. The building element 20 is built together with building elements 14 on its lower side in a known manner. The building element 20 is larger than the building elements 10 and 14, and its interior accommodates a camera with a lens 22. In a preferred embodiment, the camera is a video camera, but it is also within the scope of the invention that the camera may be any other type, such as a film camera or for recording single images on a photographic film.

The camera 20 is incorporated as a building element in the building set in the same manner as the elements 10 and 14, and it may be built together with these elements in many different ways. FIG. 3 shows an alternative position for the camera, as a camera 20' is arranged in a position in which it is rotated 90 degrees and is thus seen from the side.

FIG. 6 shows a system with a remote-controlled toy 30 composed of a plurality of toy building elements of the type described above, including building elements 14 and a building element 20 with an incorporated video camera. The remote-controlled toy 30 is here stylised and represents e.g. a remote-controlled toy car, a model aircraft or a robot.

There is a connection 31 from the camera in the element 20 to a display 32 which can show video images recorded by the video camera. The connection 31 may be a firm connection with wires, or a wireless connection where the transfer of video images takes place by means of radio signals or infrared signals or in another manner. A user can watch video images on the display, which are recorded by the video camera in the toy 30 and show the surroundings.

The user can generate control signals by means of a control unit 33 which are transmitted via a second connection 34 to the remote-controlled toy 30, which also contains a motor 35 capable of driving a wheel 36 allowing the toy 30 to drive. The motor 30 is stylised here and represents a more general motion mechanism. The motion mechanism may comprise one or more motors, which propel a remote-controlled car, and also a control mechanism for the car. In the event that the toy is other than a car, e.g. a robot or another figure, the motor 35 also represents mechanisms for moving the robot.

FIG. 7 shows another remote-controlled toy 30' where the camera 20 and the motor 35 are shown in another mutual position. Here, it is possible for the camera to "look" rearwardly from a remote-controlled toy car, while in FIG. 6 it e.g. "looks" ahead.

The building element 20 with a camera may of course also be used in more static structures where it may e.g. be used for video surveillance. The toy building element 20 including a camera can be used like any of the other building elements in the toy building set, and buildings such as a model or toy house or a dolls' house can be built. The camera in the building element 20 is thereby integrated in eg a wall of the building. The camera can have its lens viewing into a room of the house, and the viewing angle or field of sight of the camera lens can be chosen to cover as much of the room as desired. This makes it possible for users to play with eg dolls, furniture and other objects in the room and watching the play in real time on a TV screen. This is even possible with only small access openings to the room like in life-like model buildings, which have eg just a door or a window which is large enough for the user to put her or his hand through the opening and manipulate dolls and other objects in the room, while the user's view into the room is partially or totally obstructed by the user's hand, wrist or arm.

The toy building set with coupling studs shown here is just an example of toy building sets for which the invention may be applied, and it is clear that the invention may also comprise toy building sets with other forms of coupling means for the interconnection of building elements, and that the same functionality may be achieved with such other building sets.

FIG. 8 shows parts of a known toy building set with two toy figures 40, 41 on a building base 42. The building base 42 is a plate like building element with cylindrical coupling studs 43, 43' arranged in orthogonal rows on one surface of the building base 42. The coupling studs 43, 43' are of the same type as the coupling studs 21 on the toy building elements in FIGS. 1–7. The two toy figures 40, 41 are identical, and their legs have cavities 44, 44' in the bottoms of the feet and cavities 45 on the rear sides of the legs.

The cavities 44, 44' and 45 are dimensioned to receive coupling studs 21, 43 and 43' in a frictional engagement, whereby the toy figures can be held in place on the building base 42. The figure 41 is shown in a sitting position or posture where four coupling studs 43 are received in respective ones of the cavities 45 on the rear sides of the legs. The figures can also assume a standing position or posture, where two adjacent coupling studs 43 are received in the cavities 44 in the feet. The figure 40 is shown with its legs apart in a walking position. The cavity 44' in the figure's rearmost leg is shown partially receiving a coupling stud 43'. The figure 40 thus assumes a simulated walking posture, where the cavity in the bottom of the foremost leg is just about to receive a coupling stud, and the cavity in the bottom of the rearmost leg is about to be disengaged from the coupling stud 43'.

In FIG. 8 it is possible to arrange the toy figures in well defined positions determined by the coupling means consisting of the coupling studs 43, 43' on the building base 42, and of the cavities 44, 45 in the legs. In particular, the toy figure 40 can be placed in consecutive positions of a walking, running or jumping movement, and in each position the user can make an image by means of a camera, eg the camera in the building element 20 or any other suitable camera, to form a series of images, which, when played back at a proper speed, reproduce the motion in question.

The coupling studs 43 on the building base can be used as equidistant markings along a planned path of motion of a moving object such as the toy figure 40 or a vehicle. The user can thereby make images which when played back at a proper speed will simulate the planned motion, which may be uniform or non-uniform, eg simulating an accelerating vehicle.

Known building blocks, such as the building blocks 10, 14, can be used to build scenery such as houses on the building base 42 or as stand-alone pieces of scenery. Due to the coupling means that are arranged in a modular pattern on the building blocks, it is possible to build houses and other pieces of scenery, which can be accurately reproduced. This is an advantage when eg buildings are changed during recording the film, eg by a simulated earthquake. The buildings can then be accurately rebuilt for use in a repeated recording session.

Like the figures, the buildings can be placed in well-defined predetermined positions on the building base 42. This makes it possible to build scenery, which can later be reproduced very exactly.

The camera used can be any suitable camera such as a commercially available video camera or a camcorder, or it can preferably be the camera contained in the building block 20.

FIG. 9 shows a general overview of the process involved when using the invention. After planning a recording session scenery is built. This may include buildings, landscapes and fixed or movable objects in the buildings and landscapes such as toy figures and vehicles. When the scenery is built, the film is recorded. In FIG. 9 is shown a handheld camera like the camera 20 connected to a properly programmed desktop computer. The recordings made can then be edited using the computer. Editing can include adding your own sounds or pre-recorded sound effects, editing backgrounds, synthesising movements of moving objects by proper processing of individual images or frames taken during recording sessions.

Sequences, individual images, sounds and messages can be stored on storage media and can be communicated to others, eg on tangible storage media or via a network such as Internet.

What is claimed is:

1. A toy building set of building elements (10, 14) having coupling means (11, 12, 13) with which building elements (10, 14) may be built together, characterized in that one of the building elements (20) contains a camera, which is adapted to record images of its surroundings.

2. A toy building set according to claim 1, characterized in that the camera is a video camera.

3. A toy building set according to claim 2, characterized in that the building elements (10, 14, 20, 35) on one side have protruding studs (11, 21) and on another side have a cavity (12) for receiving studs (11, 21) on another building element in releasable engagement.

4. A toy building set according to claim 3, characterized in that one of the building elements (35) contains a motor for generating movement.

5. A toy building set according to claim 4, characterized in that it moreover comprises a display (32) and means (31) for transferring images from the camera (20) for display on the display (32), and a control unit (33) adapted to generate control signals for the motor (35), as well as means for transferring the control signals from the control unit (33) to the motor (35), and that the motor (35) is adapted, to respond to control signals received from the control unit (33).

6. A toy building set according to claim 5, characterized in that it comprises several building elements (35) containing a motor, and that the control unit (33) is adapted to generate control signals for at least two motors.

7. A toy building set according to claim 6, characterized in that the means (31) for transferring images from the camera (20) to the display (32) comprise a wireless connection, and that the means (34) for transferring the control signals from the control unit (3) to the motor (35) likewise comprise a wireless connection.

8. A toy building set according to claim 6, characterized in that the means (31) for transferring images from the camera (20) to the display (32) comprise a firm connection, and that the means (34) for transferring the control signals from the control unit (33) to the motor (35) likewise comprise a firm connection.

9. A toy building set of building elements with coupling means for interconnecting building elements, the coupling means being arranged in a periodical pattern with a modular spacing allowing interconnection of building elements in discrete relative positions to form composite structures, characterized in that the set includes a camera capable of registering images of its environments.

10. A toy building set according to claim 9, characterized in that the set includes movable objects.

11. A toy building set according to claim 10, characterized in that the movable object is a posable toy figure with coupling means whereby the figure can be interconnected to with building elements in said discrete positions.

12. A toy building set according to claim 10, characterized in that the movable object is a toy vehicle.

13. A film production system for making films, the system comprising a recording and editing system including a camera capable of capturing images of objects within a field of sight of the camera, recording means for recording images from the camera, and editing means for editing recorded images, objects movable within said field of sight of the camera, said movable objects having a plurality of predefined positions for said movable objects, and means for holding said movable objects in selected ones of said predefined positions when said camera records one or more images.

14. A film production system according to claim 13 characterized in that said means for holding said movable objects include toy building elements with coupling means for interconnecting building elements, where said coupling means define said predefined positions.

15. A film production system according to claim 14 characterized in that it includes a posable toy figure with coupling means whereby the figure can be interconnected with said toy building elements in said predefined positions.

* * * * *